United States Patent
Hirota

[15] 3,658,554
[45] Apr. 25, 1972

[54] METHOD OF MAKING CONFECTIONED MUSHROOMS

[72] Inventor: Sadaichi Hirota, 78 Motomachidori, 3-chome, Ikuta-ku, Kobe, Japan

[22] Filed: Dec. 17, 1969

[21] Appl. No.: 885,968

[30] Foreign Application Priority Data

Mar. 8, 1969 Japan....................................44/17729

[52] U.S. Cl..................................................99/102, 99/134
[51] Int. Cl............................................A23b 7/08, A23g 3/00
[58] Field of Search..............................................99/102, 134

[56] References Cited

UNITED STATES PATENTS

| 1,550,321 | 8/1925 | Nichols et al. | 99/102 |
| 1,009,325 | 11/1911 | Lodge | 99/102 |
| 3,482,995 | 12/1969 | Hari et al. | 99/102 |
| 1,532,476 | 4/1925 | Cruess | 99/102 |

FOREIGN PATENTS OR APPLICATIONS

| 199,661 | 6/1923 | United Kingdom | 99/102 |

Primary Examiner—Raymond N. Jones
Assistant Examiner—J. M. Hunter
Attorney—Craig, Antonelli & Hill

[57] ABSTRACT

Process of producing confectioned mushrooms by soaking a bundle of mushrooms in one or more tankfuls of a boiling organic acid solution, all at once or in successive tanks, and then sequentially soaking the mushrooms in ever-increasing concentrations of syrup. The obtained soaked mushrooms are then heated, coated with a layer of syrup and dried.

12 Claims, No Drawings

METHOD OF MAKING CONFECTIONED MUSHROOMS

BACKGROUND OF THE INVENTION

This invention relates to a method for making confectioned mushrooms. More particularly, it relates to a method of making confectioned mushrooms which comprises impregnating mushrooms with sugar in a particularly unique manner.

Confections are, of course, well known in the art. The method according to the present invention enables confectioners to make a novel product in which all of the characteristic properties of a mushroom in connection with the aroma, color and flavor thereof are preserved. The confection made by the present method gives a tactile impression of mushrooms on the tongue in spite of the fact that every part of the mushroom contained in the confection is impregnated with sugar.

One of the objects of the present invention is to provide an improved method for making confectioned mushrooms.

Another object of the present invention is to provide confectioned mushrooms having the characteristic properties of mushrooms.

A further object of the invention is to provide a method for producing confectioned mushrooms which may be carried out in an efficacious and relatively simple manner to give a product of high quality.

These and other objects and advantages of the present invention will become apparent to those skilled in the art from a consideration of the following specification and claims.

SUMMARY OF THE INVENTION

In accordance with the present invention, the confectioned mushrooms are prepared by soaking a bundle of mushrooms in an organic acid solution, or sequentially in a series of batches of organic acid solution which has been brought to the boil, soaking the mushrooms in a plurality of syrup solutions, gradually increasing the concentration of syrup as the mushrooms are soaked in succeeding tanks, and then heating the mushrooms by means of a high frequency means. The treated mushrooms are thereafter coated with a layer of syrup and dried.

DESCRIPTION OF A PREFERRED EMBODIMENT

The following embodiment is given merely as illustrative of the present invention and is not to be considered as limiting. Unless otherwise noted, the percentages therein and throughout the application are by weight.

An approximately 1 percent organic acid solution is heated until it comes to a boil. Mushrooms, such as *Agaricus campestris*, are rinsed and the dust or the like on their surfaces is washed off. Then, the mushrooms are soaked in the above-mentioned boiling solution for approximately 5 minutes for the purpose of attaining the objectives noted below. Then, the mushrooms are transferred into another organic acid solution, which is likewise boiling, and then into still another. All in all, the mushrooms are soaked approximately three times, each soaking taking place in a different solution.

The procedure of soaking the mushrooms in one boiling solution after another, for approximately 5 minutes at each stage, is carried out with a view toward attaining the following five ends:

First of all, the above-mentioned soaking operation softens the tissues of the mushrooms.

Secondly, this procedure raises the flavor of the mushrooms by removing the harshness therefrom.

Third, the successive soaking procedure preserves the natural color and aroma of the mushrooms by restraining the action of enzymes contained therein.

Fourth, this procedure results in a gloss on the mushrooms with the aid of the organic acid, such as citric acid or a derivative thereof, and thereby raises the commercial value of the product.

Finally, the stepwise soaking procedure employed in the present invention permits the mushrooms to take in as much water as possible so that, when they are soaked in syrup at the next stage in the process, they do not become dehydrated at once.

The second stage in the process according to the present invention comprises soaking the mushrooms, which have been taken out of the boiling solution, in one batch or tankful of syrup after another with a view to mixing the water impregnated in the mushrooms and the syrup through diffusion and, consequently, impregnating the mushrooms with syrup.

In this particular embodiment, there are eight tankfuls of syrup in all. Each tankful of syrup, which comprises water, sugar and an anti-crystallization agent, is held at a temperature of approximately 58° C. during the operation. Lower temperatures than this make it difficult for the mushrooms to be impregnated with syrup, on the one hand, and provide a basis for the generation of undesirable microorganisms, on the other hand. Higher temperatures than approximately 58° C. cause the sugar in the syrup to undergo a chemical change and, consequently, browning.

The weight percentages of the above-mentioned three components of the syrup vary from tankful to tankful, so that the concentration of syrup is gradually stepped up as the mushrooms advance from the first tank toward the eighth. By way of example, the weight percentages of the components of the first tankful in this particular embodiment are as follows and, consequently, the concentration of syrup in the first tank turns out to be approximately 45 percent:

| | |
|---|---|
| Water | 55.0% |
| Sugar | 40.5% |
| Anti-crystallization agent, such as glucose | 4.5% |

The following table shows how both the concentration of syrup and the length of time of soaking are gradually stepped up.

| Tankful | Concentration of syrup (%) | Soaking time (hours) |
|---|---|---|
| 1st | approx. 45 | approx. 12 |
| 2nd | approx. 50 | approx. 12 |
| 3rd | approx 54 | approx. 12 |
| 4th | approx. 58 | approx. 14 |
| 5th | approx. 62 | approx. 18 |
| 6th | approx. 66 | approx. 18 |
| 7th | approx. 70 | approx. 20 |
| 8th | approx. 72 | approx. 20 |
| | | 126 hours in all |

The reason for soaking the mushrooms in a comparatively thin syrup at first is that if they were suddenly soaked in a thick syrup from the outset, they would be dehydrated at once, no matter how much water they might have taken in. Consequently, the mushrooms would be stiffened and, hence, the commercial value of the product would fall greatly.

The reason for gradually stepping up the number of hours soaking as the mushrooms advance from the first tank toward the eighth is that, as the syrup becomes thick, it naturally takes more time for the mushrooms to be impregnated with syrup.

Although the syrup becomes supersaturated when its concentration exceeds approximately 65 percent, only part of the solute is formed into crystals because of the fact that an anti-crystallization agent, such as glucose, is included in the syrup.

At the third stage in the process according to the present invention, the mushrooms impregnated with syrup undergo high-frequency heating and are heated thereby to approximately 80° C. The high-frequency heating step is carried out with a view toward simultaneously heating both the surface and the interior of the mushrooms so that both the surface and the interior are uniformly dried in moderation, and no bubbles remain in the interior portions of the mushrooms. If the surface and the interior of the mushrooms are not uniformly dried, a gap will result between the mushrooms and the coating, the latter appearing as a lump on the surface of the mushrooms at the next stage in the process according to the present invention.

The fourth stage in the process involves coating a lump or bunch of the mushrooms with a layer of syrup. This coating step is carried out by drenching the lump with syrup which has been heated to approximately 105° C. and concentrated to approximately 78 percent. Meanwhile, before the syrup is heated and concentrated, it must be brayed so that its turbidity is reduced and, when the lump of mushrooms has been coated therewith, the mushrooms can be seen through the coating.

The final stage in the process according to the present invention comprises drying the lump of mushrooms, which has been coated with a layer of syrup, in a drying room where the temperature is held at about 28° C. and the humidity at 65 percent.

Although specific parameters are set forth in connection with the above-described preferred embodiment, the procedure may be modified as desired and suitable to attain various objectives within the scope of this invention. Thus, in the first step, non-toxic organic carboxylic acids, including mixtures thereof may be employed in the soaking operation. Citric acid, and mixtures of citric acid with other organic carboxylic acids are preferred.

While temperatures substantially lower or higher than 58° C. are not desirable during the soaking of the mushrooms in syrup in the second step of the procedure, a temperature range of 55°–65° C. is quite suitable and practical for this step. Glucose has been specifically mentioned as the anti-crystallization agent hereinabove, but other substances, such as dextrin (one of the major components of millet jelly), glycerin and sorbitol, may also be employed, preferably in mixture with glucose. Visco (a component of invert sugar) and honey can also be used an anti-crystallization agents. Dextrin (in the form of millet jelly) and glucose are preferred. Approximately 10–20 percent by weight of anti-crystallization agent is preferably employed.

The term "sugar" herein refers to saccharides as found in sugar cane, i.e., simple carbohydrates.

The high-frequency heating used in the third step is most preferably conducted with an electronic heating means at a frequency of 2,450 megacycles. Electronic heating makes it possible to heat the confections from the interior parts to the exterior parts thereof gradually. While infra-red heating may be used, for example, this is not as desirable because of the possibility of scorching the surface of the confections, and special care must be taken if infra-red heating is used. In other words, infra-red heating operates to heat the confections from the exterior surface thereof to the interior parts, which is more difficult to control in preventing undesirable damage to the mushrooms.

While I have disclosed one preferred embodiment of the present invention, it is to be understood that this embodiment has been given by way of example only and not in a limiting sense. Accordingly, the invention being thus described, it will be obvious that the same may be varied in many ways. Such variations are not to be regarded as a departure from the spirit and scope of the invention, and all such modifications as would be obvious to one skilled in the art are intended to be included herein.

I claim:

1. A method for the preparation of confectioned mushrooms comprising the steps of:
   a. soaking a bundle of mushrooms in at least one aqueous carboxylic acid solution at the boiling temperature of said solution, either in one batch or sequentially in a series of batches of said carboxylic acid solution, for a time sufficient to soften the tissues of the mushrooms, to impregnate the mushrooms with water, and to restrain the action of enzymes contained therein,
   b. soaking the resultant mushrooms in successive batches of syrup at a temperature of approximately 58° C., the concentration of the syrup gradually increasing from 45 percent in the first batch to 72 percent in the last batch, and said syrup comprising water, sugar, and an anti-crystallization agent, for a time sufficient to impregnate the mushrooms with syrup,
   c. heating the obtained mushrooms by a high frequency means at an elevated temperature for a period sufficient to dry said mushrooms,
   d. coating the resultant bundle of mushrooms with a layer of syrup at a temperature of approximately 105° C., and
   e. drying the bundle of mushrooms.

2. The method of claim 1, wherein the bundle of mushrooms is soaked in a series of batches of the boiling carboxylic acid solution for about 15 minutes and thereafter soaked in the successive batches of syrup for a time of approximately 12 to 20 hours per batch.

3. The method of claim 1, wherein an approximately 1 percent carboxylic acid solution is employed.

4. The method of claim 1, wherein the mushrooms are soaked in three batches of carboxylic acid solution.

5. The method of claim 4, wherein the soaking is conducted for approximately 5 minutes in each of the carboxylic acid solutions.

6. The method of claim 1, wherein said carboxylic acid is citric acid.

7. The method of claim 1, wherein said anti-crystallization agent is glucose.

8. The method of claim 1, wherein the mushrooms are heated in step (c) to approximately 80° C.

9. The method of claim 1, wherein the coating step (d) is conducted using syrup having a concentration of about 78 percent.

10. The method of claim 1, wherein the drying step (e) is carried out at about 28° C.

11. A method for the preparation of confectioned mushrooms comprising the steps of:
   a. bringing three batches of an aqueous citric acid solution to boil,
   b. soaking a bundle of mushrooms in the boiling citric acid solution sequentially in each bath for a period of approximately five minutes in each of the solutions,
   c. removing the bundle of mushrooms from the last batch of boiling citric acid solution,
   d. soaking the acid-treated mushrooms in successive batches of syrup maintained at a temperature of approximately 58° C., the concentration of syrup gradually increasing from 45 percent in the first batch to 72 percent in the last batch, said syrup comprising water, sugar, and an anti-crystallization agent, for a period of several hours to replace the water impregnated in the acid solution with syrup,
   e. heating the obtained mushrooms by a high frequency heating means at a temperature of approximately 80° C. for a time sufficient to uniformly dry both the interior and the surface of the mushrooms,
   f. coating the resulting mushrooms with a layer of syrup at a temperature of approximately 105° C. to obtain a transparent layer thereon, and
   g. drying the mushrooms at a temperature of about 28° C.

12. The method of claim 11, wherein said anti-crystallization agent is glucose.

* * * * *